United States Patent
Powalowski

(10) Patent No.: US 8,954,314 B2
(45) Date of Patent: Feb. 10, 2015

(54) PROVIDING TRANSLATION ALTERNATIVES ON MOBILE DEVICES BY USAGE OF MECHANIC SIGNALS

(71) Applicant: Google Inc., Mountain View, CA (US)

(72) Inventor: Piotr Powalowski, Zielona Gora (PL)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 13/625,027

(22) Filed: Sep. 24, 2012

(65) Prior Publication Data

US 2013/0231914 A1 Sep. 5, 2013

Related U.S. Application Data

(60) Provisional application No. 61/605,349, filed on Mar. 1, 2012.

(51) Int. Cl.
*G06F 17/28* (2006.01)

(52) U.S. Cl.
USPC .......................................... 704/3; 704/2; 704/5

(58) Field of Classification Search
CPC ..................................................... G06F 17/28
USPC .......................................................... 704/2–8
See application file for complete search history.

(56) References Cited

U.S. PATENT DOCUMENTS

| | | | |
|---|---|---|---|
| 2004/0030542 A1* | 2/2004 | Fuji | 704/2 |
| 2005/0038643 A1* | 2/2005 | Koehn | 704/2 |
| 2006/0217958 A1* | 9/2006 | Tagawa et al. | 704/2 |
| 2007/0022134 A1* | 1/2007 | Zhou et al. | 707/102 |
| 2007/0203688 A1* | 8/2007 | Fuji et al. | 704/2 |
| 2008/0306728 A1* | 12/2008 | Kamatani et al. | 704/7 |
| 2010/0030549 A1 | 2/2010 | Lee et al. | |
| 2011/0055188 A1 | 3/2011 | Gras | |
| 2011/0307241 A1* | 12/2011 | Waibel et al. | 704/2 |
| 2013/0103383 A1* | 4/2013 | Du et al. | 704/3 |

FOREIGN PATENT DOCUMENTS

| | | | | |
|---|---|---|---|---|
| JP | 62286171 A | * 12/1987 | | G06F 15/38 |
| KR | 2011039660 | 4/2011 | | |
| WO | 2010105440 | 9/2010 | | |
| WO | 2011094090 | 8/2011 | | |

* cited by examiner

*Primary Examiner* — Jesse Pullias

(74) *Attorney, Agent, or Firm* — Remarck Law Group PLC

(57) ABSTRACT

Disclosed is subject matter that provides a technique and a device that may include an accelerometer, a display device, an input device and a processor. The input device may receive textual information in a first language. The processor may be configured to generate a plurality of probable translation alternatives for a translation result. Each probable translation alternative may be a translation of the textual information into a second language. The processor may present a first of the plurality of probable translation alternatives on the display device in an alternate translation result dialog screen. Based on an accelerometer signal, the processor may determine whether the device is being shaken. In response to a determination the device is being shaken, the processor may present a second of the plurality of probable translation alternatives on the display device in place of the first of the plurality of probable translation alternatives.

20 Claims, 4 Drawing Sheets

400

```
┌─────────────────────────────────────────────────────────────┐
│ obtaining a plurality of probable translation alternatives for a │
│ translation result, each probably translation alternative being a │     410
│ translation of the textual information into a second language │
└─────────────────────────────────────────────────────────────┘
                              │
                              ▼
┌─────────────────────────────────────────────────────────────┐
│ presenting a first probable translation alternative on a display │     420
│ device in an alternate translation result dialog screen      │
└─────────────────────────────────────────────────────────────┘
                              │
                              ▼
┌─────────────────────────────────────────────────────────────┐
│ determining, based on an accelerometer signal, whether the device │   430
│ is being shaken                                              │
└─────────────────────────────────────────────────────────────┘
                              │
                              ▼
┌─────────────────────────────────────────────────────────────┐
│ responding to a determination that the device is being shaken by │
│ presenting a second of the plurality of probably translation │
│ alternatives in the alternate translation result dialog screen on the │  440
│ display device in place of the first of the plurality of probable │
│ translation alternatives                                     │
└─────────────────────────────────────────────────────────────┘
```

FIG. 4

PROVIDING TRANSLATION ALTERNATIVES ON MOBILE DEVICES BY USAGE OF MECHANIC SIGNALS

CROSS-REFERENCE TO RELATED APPLICATIONS

This application claims priority to U.S. Provisional Application No. 61/605,349, filed Mar. 1, 2012, the disclosure of which is incorporated herein in its entirety for all purposes.

BACKGROUND

Translation systems typically provide the most likely translation result to the user even though the "most likely translation result" may be incorrect. This can be the case for desktop as well as mobile devices. Commonly, if a user wishes to obtain a new translation, such as to replace an incorrect translation, the user must start over and hope the translation engine provides a different result. This can be true for both text input devices and mobile devices. For example, some devices that provide speech translation capabilities require restarting when an incorrect translation result is output. The methods for restarting may include re-entering text in a desktop application, or turning a device off and on, or providing some other input or signal to the device that it is to restart the translation. It would be beneficial if a device could provide a simple user interface that provided an alternate translation result without restarting the translation process, repeating inputs or requiring complex input sequences into the device.

BRIEF SUMMARY

A device according to an embodiment of the disclosed subject matter may include an accelerometer, a display device, an input device and a processor. The input device may receive audio data including words spoken in a first language. The processor may be configured to generate a plurality of probable translation alternatives for a translation result. Each probable translation alternative may be a translation of the textual information into a second language. The processor may present a first of the plurality of probable translation alternatives on the display device in an alternate translation result dialog screen. Based on an accelerometer signal, the processor may determine whether the device is being shaken. In response to a determination the device is being shaken, the processor may present a second of the plurality of probable translation alternatives on the display device in place of the first of the plurality of probable translation alternatives.

A method according to an embodiment of the disclosed subject matter may include receiving audio data received by a microphone. The audio data may include spoken words in a first language. A plurality of probable translation alternatives may be obtained, and each probable translation alternative being a translation of the audio data into a second language. The plurality of probable translation alternatives may be stored in a memory on the device. The alternative translation result dialog screen may be generated for presentation. A first probable translation alternative may be presented in the alternative translation result dialog screen on a display device. A determination that the device is being shaken may be based on an accelerometer signal. In response to a determination that the device is being shaken, a second of the plurality of probable translation alternatives may be presented in the alternative translation result dialog screen on the display device in place of the first of the plurality of probable translation alternatives. A selection of one of the probable translation alternative of the plurality of probable translation alternatives may be responded to by the device.

According to some embodiments of the disclosed subject matter, the input device may be integrated into the display device, and the display device may be a touchscreen. The processor may respond to a touchscreen swipe gesture to change the present translation alternatives in the list of probable translation alternatives. The input device may be a keyboard. The probable translation alternatives may be a subset of the translation results.

According to another embodiment of the disclosed subject matter, a technique of viewing probable translation results on a device may be provided. The technique may include generating a plurality of probable translation alternatives for a translation result. Each probable translation alternative may be a translation of the textual information into a second language. A first probable translation alternative may be presented on a display device in an alternate translation result dialog screen. Based on an accelerometer signal, a processor may determine whether the device is being shaken. In response to a determination that the device is being shaken, the technique may present a second of the plurality of probably translation alternatives in the alternate translation result dialog screen on the display device in place of the first of the plurality of probable translation alternatives.

The technique may further include detecting by the processor a touch over the alternate translation result dialog screen on a touchscreen input device. In response an alternate translation result dialog screen may be presented with another probable translation alternative of the plurality of the probable translation alternatives. The technique may further include presenting the alternate translation result dialog screen in response to a detection of a touch hovering over the translation result that has an alternate translation result, wherein the hovering alternate translation result dialog screen partially occludes the translation result.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an exemplary flowchart according to an embodiment of the disclosed subject matter.

DETAILED DESCRIPTION

Figure 1:
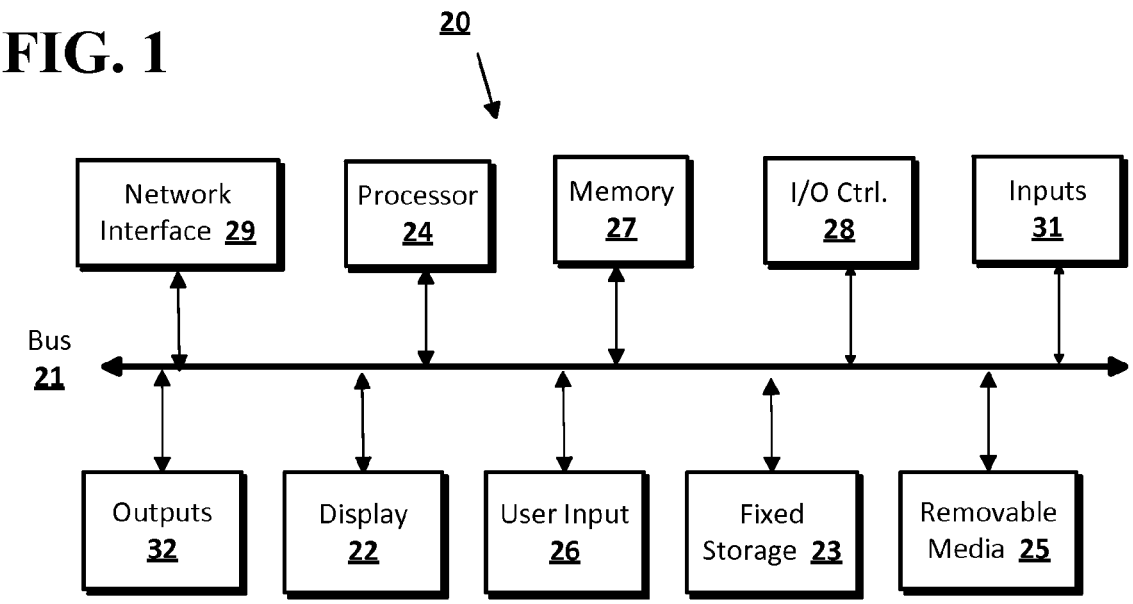
FIG. 1 shows a computer according to an embodiment of the disclosed subject matter.

Embodiments of the presently disclosed subject matter may be implemented in and used with a variety of component and network architectures. FIG. 1 is an exemplary computerized device 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output (I/O) controller 28, a user display 22, such as a display screen via a display adapter, or a touchscreen; a user input interface 26, which may include one or more controllers and associated user input devices such as a keyboard, mouse, touchscreen, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The device 20, in addition to a display device 22, may include outputs 32, such as speakers, a headphone jack, USB port and the like, that are controlled by the I/O controller 28. The device 20 may also include inputs 31 that may be connected to, for example, a microphone (not shown), a keyboard (not shown), an accelerometer (not shown) or similar device. The accelerometer, for example, may output a signal in response to a movement, such as shaking, of the device 20 to the bus 21. The outputted signal may be received and processed by the computer 20.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computerized device such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
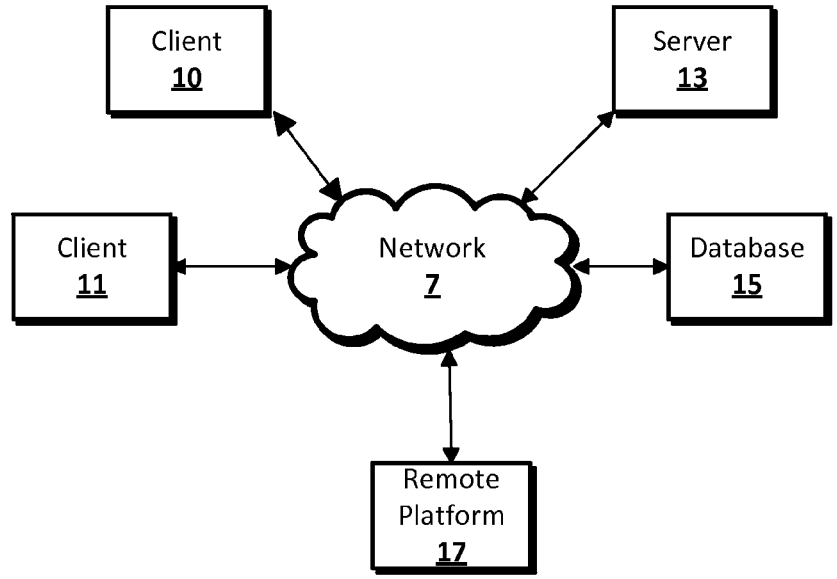
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices, or clients, via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

In an exemplary user scenario, a user may access a computer application such as a language translation application, stored in one or more of data storage 23, 25 or 27 on a mobile device 20, such as a smartphone. The application may provide functionality to translate a spoken or text word, phrase or sentence. The device 20 may receive speech or text via an input device 31, which then may be translated into another language selected by the user. For example, the user may speak English and want to ask a Spanish-speaking person a question. The device 20 may receive the question spoken in English via a microphone from the user. A translation engine (stored in one or more of data storage 23, 25 or 27) may be executed to output the question as Spanish text on a display of the device, and/or output a machine-generated speech of the question. The translation engine may perform the translation using known techniques, such as converting the speech to text, and then comparing the text to a look up table to provide a translation result, for example. However, a word in the spoken or texted phrase may not be translated with a threshold minimum probability that the translation result is correct. For example, a system may use a threshold probability of 97%, meaning that translations having a confidence of less than 97% that the translation is correct would not meet the threshold. Typically, if a translation has a lower likelihood of being correct, the translation engine may have multiple probable translation results for the input text. For example, the English word "bear" may be confused with the word "bare" by the translation engine. In which case, the translation engine may provide the Spanish words "oso" for "bear" and "desnudo" for "bare," respectively. The translation engine may assign a probability of a correct translation to each word based on the context of the word in the phrase. In the present example, the translation engine may provide an alternative translated word "oso" because it was assigned a probability, for example, 90%, of being a correct translation result, while "desnudo" may be assigned an 85% probability of correct translation result. The probability can not only be represented with percentages, but with any type of numeric or alphanumeric score. The translation engine may provide a list of alternative translation results with an assigned probability score to a data storage, such as a memory or fixed storage, for retrieval by the mobile device processor.

Figure 3A:
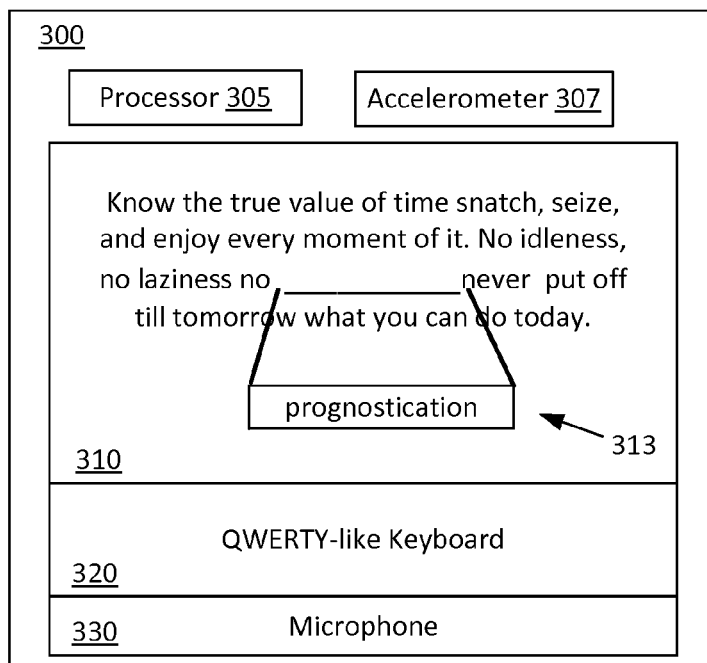
FIGS. 3A-C show an exemplary functional block diagram of a device implementation according to an embodiment of the disclosed subject matter.
Figure 3B:
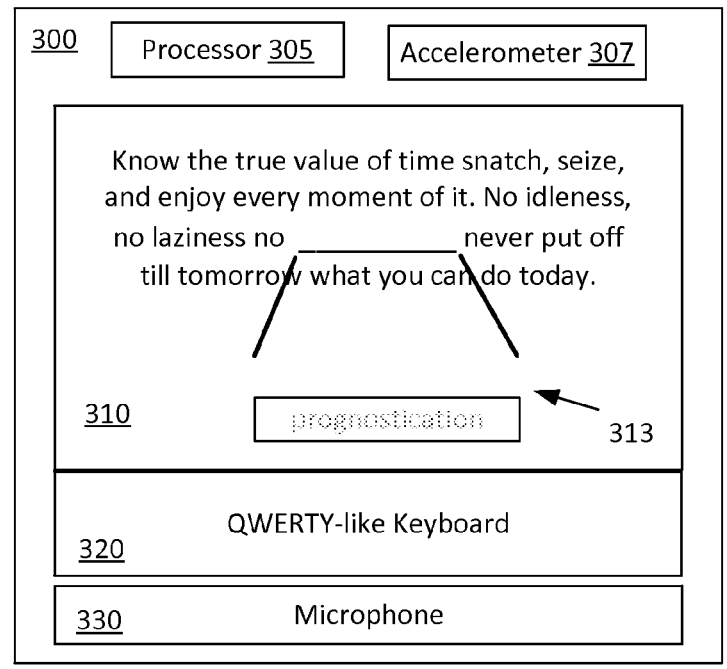
Figure 3C:
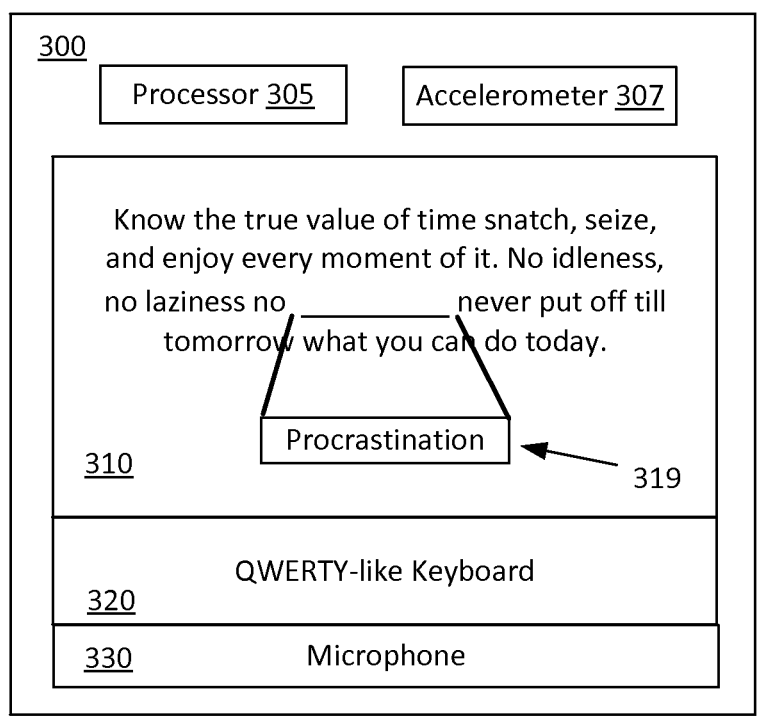

FIGS. 3A-C show an exemplary functional block diagram of a device implementation according to an embodiment of the disclosed subject matter. Device 300 of FIGS. 3A-C may include a processor 305, an accelerometer 307, a display 310, a QWERTY-like keyboard 320, a microphone 330, and other components as described with respect to device 20 shown in FIG. 1. The keyboard 320 may be a separate input device or may be integrated into the display 310 as in the case of a touchscreen, for example. In the illustrated example, a Spanish speaking user may want to quote an exemplary saying to an English speaking person. The processor 305 may perform the translation as explained above, and generate an alternative translation dialog screen. In FIG. 3A, the display 310 shows an output of an exemplary translation of the quotation with a probable translation result in an alternative translation dialog screen 313 that does not meet the threshold for a correct translation result as explained above. In the example, the alternative translation dialog screen 313 shows the translation with the highest probability score is the word "Prognostication," which in the example is an incorrect or undesired translation result. To receive the next probable alternative translation result, a user may shake the device as shown in FIG. 3B. When the device 300 is shaken, the alternative translation dialog screen 315 may still be presented, or may disappear completely. FIG. 3C shows the presentation of the next probable alternative translation result, "procrastination," which is the correct word, in the alternative translation dialog screen 319. The user may input a command or otherwise select a probable alternative translation result as the correct word.

The device 300 may also respond to a swipe gesture or a touch hovering over the translation result to change the presented alternative translation result from a first translation to the next alternative translation. In addition, the display of the alternative translation results may loop through all of the alternative translation results a subsequent time until the user selects a translation result from the presented list.

FIG. 4 shows an example technique for implementing an embodiment of the disclosed subject matter. The technique 400 may obtain at least one probable translation alternatives for a translation result at step 410. Each of the probable translation alternatives may be a translation of received text, spoken words, or the like into a second language, and each may be assigned a different probability score. At step 420, a first probable translation alternative may be presented, such as in an alternate translation result dialog screen as previously described. In response to a user action, such as shaking a device that implements the technique of FIG. 4, at step 440 a second of the plurality of probably translation alternatives may be presented to the user. The second and any further translation alternatives may be presented in the alternate translation result dialog as previously described.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
   receiving an input in a first language;
   obtaining a plurality of probable translation alternatives for a translation result, each probable translation alternative being a translation of the input into a second language;
   presenting a first of the plurality of probable translation alternatives on a display;
   determining that the device is being shaken;
   responsive to a determination that the device is being shaken, presenting a second of the plurality of probable translation alternatives in the alternate translation result dialog screen on the display; and
   responsive to subsequent determinations that the device is being shaken, presenting the alternative translation results in a loop through all of the alternative translation results until the user selects a translation result from the presented list.

2. The method of claim 1, the method further comprising:
   detecting by the processor a swipe gesture over a translation result dialog screen on the display; and
   presenting an alternate translation result dialog screen with another probable translation alternative of the plurality of the probable translation alternatives.

3. The method of claim 1, the method further comprising:
   presenting the alternate translation result dialog screen in response to a detection of a touch hovering over the translation result that has an alternate translation result, wherein the hovering alternate translation result dialog screen partially occludes the translation result.

4. The method of claim 1, wherein the probable alternate translation results are presented in an order based upon the probability of each displayed probable alternate translation result being a correct translation result.

5. The method of claim 1, wherein the first of the plurality of probable translation alternatives is presented in an alternate translation result dialog screen.

6. The method of claim 1, wherein the input information is audio data received from a microphone.

7. The method of claim 1, wherein the input information is textual data received from a keyboard.

8. The method of claim 1, wherein the first of the plurality of probable translation alternatives has a highest probability score of the plurality of probable translation alternatives.

9. A device, comprising:
an accelerometer;
a display device;
an input device for receiving input in a first language; and
a processor configured to:
   obtain a plurality of probable translation alternatives for a translation result, each probable translation alternative being a translation of an input received from the input device into a second language;
   present a first of the plurality of probable translation alternatives on the display device;
   determine, based on a signal generated by the accelerometer, whether the device is being shaken;
   responsive to a determination that the device is being shaken, present a second of the plurality of probable translation alternatives on the display device in place of the first of the plurality of probable translation alternatives; and
   respond to subsequent determinations that the device is being shaken by presenting the alternative translation results in a loop through all of the alternative translation results until the user selects a translation result from the presented list.

10. The device of claim 9, wherein the input device is integrated into the display device.

11. The device of claim 10, wherein the display device is a touchscreen.

12. The device of claim 9, wherein the input device is a microphone and the input information is audio data received from the microphone.

13. The device of claim 9, wherein the input device is a keyboard and the input information is textual data received from the keyboard.

14. The device of claim 9, wherein the processor responds to a touchscreen swipe gesture to change the presented translation alternative.

15. The device of claim 9, wherein the probable translation alternatives are a subset of the translation results.

16. The device of claim 9, wherein the processor is configured to receive the accelerometer signal over a bus.

17. The device of claim 9, wherein the first of the plurality of probable translation alternatives has a highest probability score of the plurality of probable translation alternatives.

18. A method comprising:
receiving an input in a first language;
obtaining a plurality of probable translation alternatives for a translation result, each probable translation alternative being a translation of the input into a second language;
presenting a first of the plurality of probable translation alternatives on a display;
detecting by the processor a swipe gesture over a translation result dialog screen on the display; and
presenting an alternate translation result dialog screen with another probable translation alternative of the plurality of the probable translation alternatives.

19. A method comprising:
receiving an input in a first language;
obtaining a plurality of probable translation alternatives for a translation result, each probable translation alternative being a translation of the input into a second language;
presenting a first of the plurality of probable translation alternatives on a display; and
presenting an alternate translation result dialog screen in response to a detection of a touch hovering over the first of the plurality of probable translation alternatives that has an alternate translation result, wherein the hovering alternate translation result dialog screen partially occludes the translation result.

20. The method of claim 19, further comprising:
detecting by the processor a swipe gesture over the alternate translation result dialog screen on the display; and
presenting a second of the plurality of probable translation alternatives in the alternate translation result dialog screen in response to detecting the swipe gesture.

* * * * *